United States Patent Office 3,095,028
Patented June 25, 1963

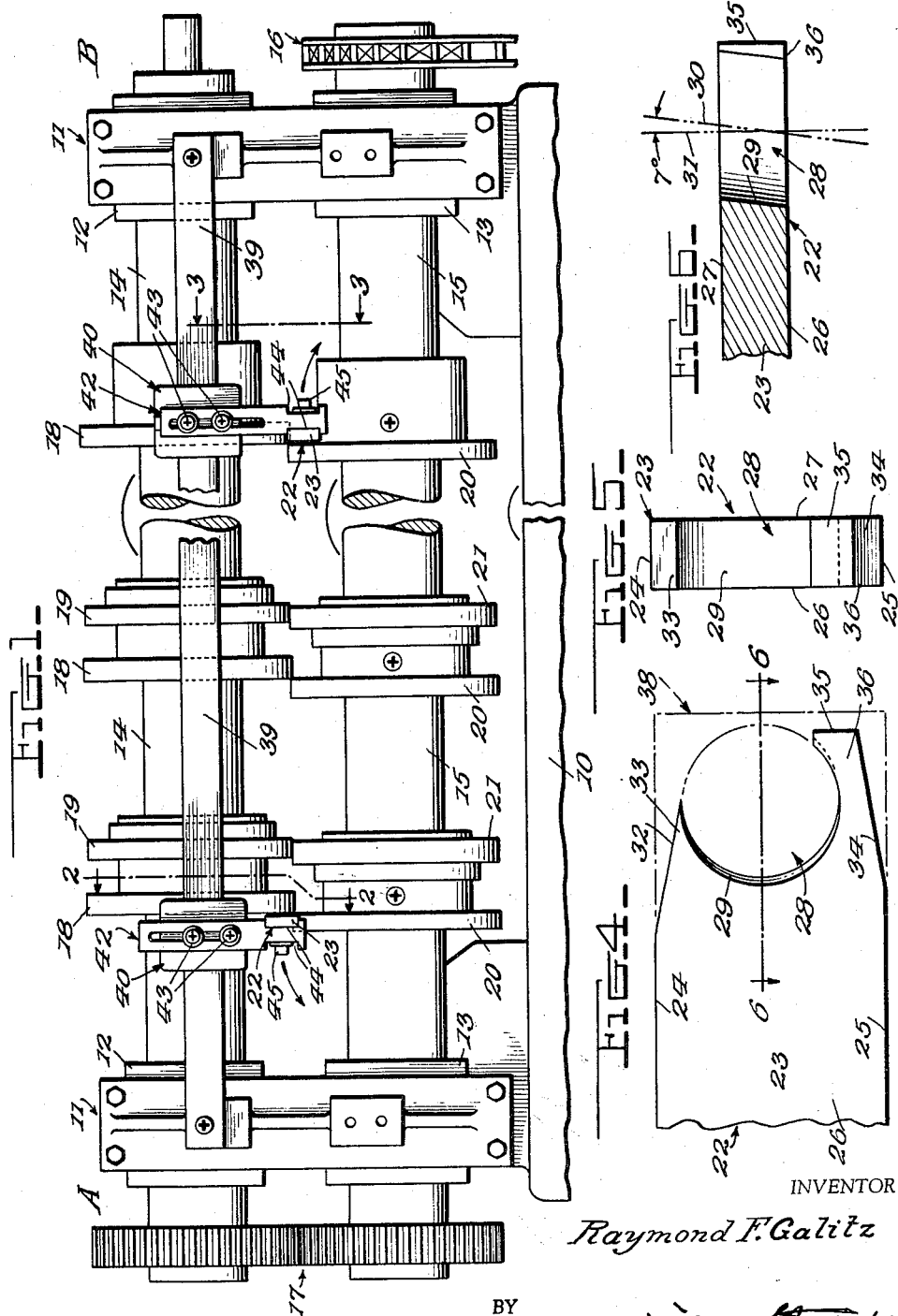

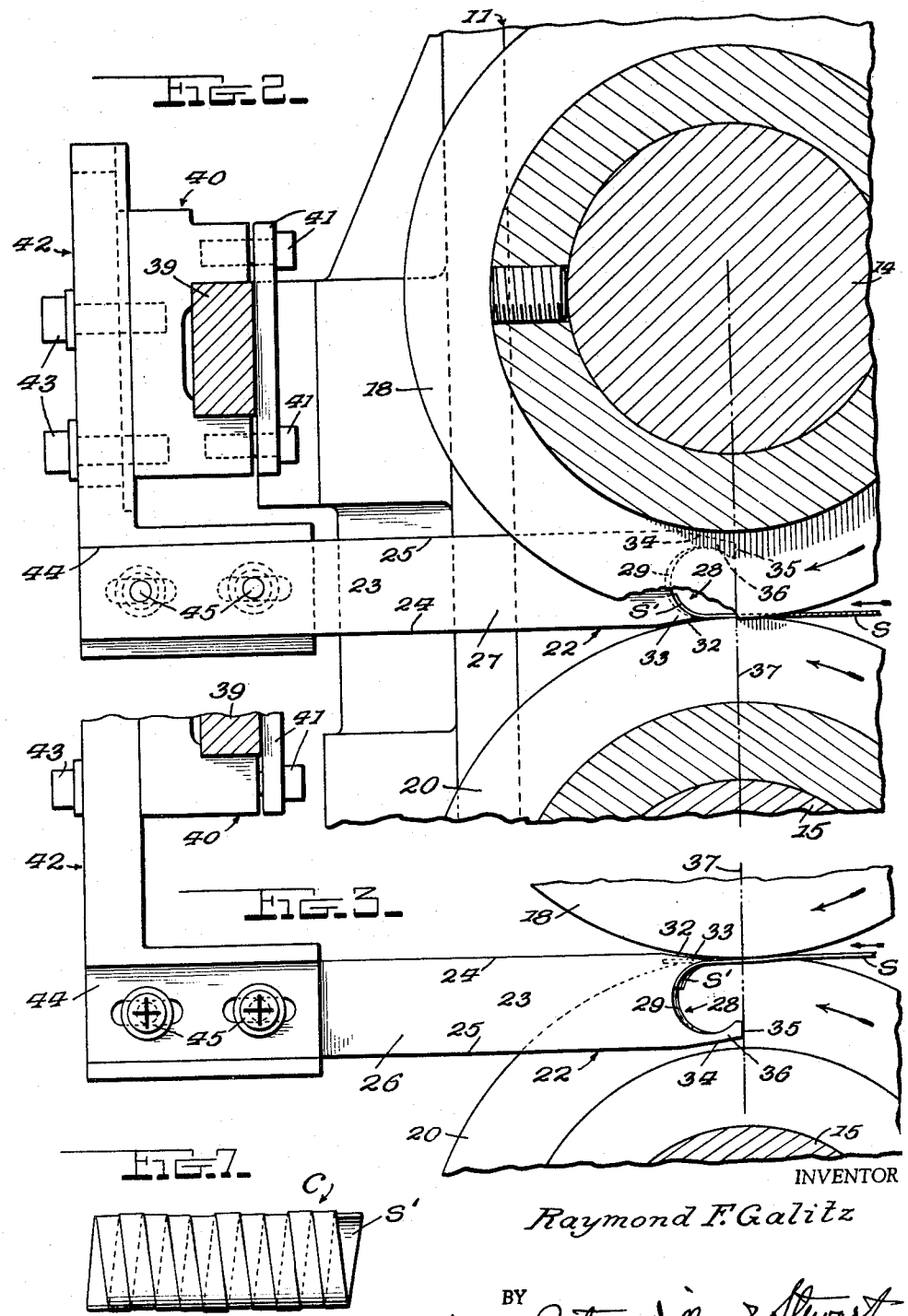

3,095,028
SHEET SLITTING AND SCRAP COILING METHOD
Raymond F. Galitz, La Grange, Ill., assignor to Continental Can Company, Inc., New York, N.Y., a corporation of New York
Original application Oct. 24, 1955, Ser. No. 542,290, now Patent No. 2,969,103, dated Jan. 24, 1961. Divided and this application June 2, 1960, Ser. No. 33,546
3 Claims. (Cl. 153—2)

In forming sheet metal blanks from which to construct can bodies, a slitting and trimming machine is employed for cutting relatively large sheets into blanks of required size. The machine includes "first operation" cutters which trim two edges of each sheet and cut the latter into strips of equal width. The machine also includes "second operation" cutters which trim the ends of the strips and cut the latter into blanks of required size.

The narrow scrap strips trimmed off by the cutters vary in width up to ¼ inch, and may be up to 40 inches long, and it is very difficult to remove these scrap strips from the floor around the slitting machine. They can be shoveled or forked only with great difficulty and expenditure of time and moreover create quite a hazard, not only when cleaning the floor but during machine operation. Then, too, a scrap strip will sometimes find its way into the can body maker with the body blanks, necessitating machine shut-down and loss of time, even if causing no machine damage.

The present invention has aimed to overcome the above-mentioned difficulties by progressively coiling each scrap helically about an axis as this strip is being progressively cut from the sheet. The forward motion of each sheet being cut is utilized to progressively feed the scrap strip into a scrap strip coiling device, and this device is utilized to progressively coil the scrap strip into a tight coil. Thus, upon final severance from the sheet, each scrap strip will be in the form of a tight substantially cylindrical coil. An accumulation of these coils may be easily shoveled from the floor with no hazard and with little expenditure of time.

The above-mentioned cutters are in the form of slightly overlapped upper and lower disks, the upper disks being mounted on an upper shaft and the lower disks on a lower shaft. These shafts also carry so-called "steady rolls" which feed the sheets between the cutting disks as said shafts are driven in opposite directions. The disks toward the ends of the shafts perform the trimming operations, and a further object of the invention has been to provide an exceptionally simple yet highly effective coiling device constructed to receive and coil each scrap strip as it is progressively cut from the sheet by these trimming disks.

It is customary to have all of the upper cutting disks overlap the same side of the coacting lower disks. Thus, at one side of the machine, the endmost lower disk is at the outer side of the coacting upper disk, while at the other side of the machine, the endmost upper disk is at the outer side of the coacting lower disk. Therefore, the scrap strip at said one side of the machine will be over the lower trim disk, whereas the scrap strip at said other side of the machine will be under the upper trim disk. Another object of the invention has therefore been to provide a novel scrap strip coiling device equally effective over the lower trim disk at said one side of the machine and under the upper trim disk at said other side of the machine.

This application is a division of my copending application, Serial No. 542,290, filed October 24, 1955, and now Patent No. 2,969,103.

With the above and other objects in view that will hereinafter appear, the nature of the invention will be more clearly understood by reference to the following detailed description, the appended claims and the several views illustrated in the accompanying drawings.

The accompanying drawings illustrate the invention associated with the "first operation" cutters, but it may obviously be employed also for coiling the relatively short scrap strips produced by the "second operation" cutters.

In the drawings:

FIGURE 1 is a rear end elevation of the "first operation" portion of a sheet slitting machine embodying the scrap strip coiling means.

FIGURE 2 is an enlarged vertical sectional view on line 2—2 of FIGURE 1.

FIGURE 3 is a similar view on line 3—3 of FIGURE 1.

FIGURE 4 is a further enlarged fragmentary side elevation, showing the front end portion of one of the scrap strip coiling devices.

FIGURE 5 is a front end view of the device shown in FIGURE 4.

FIGURE 6 is a horizontal sectional view on line 6—6 of FIGURE 4.

FIGURE 7 is a side elevation of one of the coiled scrap strips.

A portion of the base of a sheet slitting and trimming machine is shown at 10 in FIGURE 1. Posts 11 rise rigidly from the base 10 and carry upper bearings 12 and lower bearings 13. An upper horizontal shaft 14 and a lower horizontal shaft 15 are rotatably mounted in the bearings 12 and 13, respectively. Driving means for one of the shafts is shown at 16, and the two shafts are geared together at 17 for simultaneous rotation in opposite directions.

The upper shaft 14 carries slitting disks 18 and "steady rolls" 19. The lower shaft 15 also carries slitting disks 20 and "steady rolls" 21. The upper slitting disks 18 slightly overlap the lower slitting disks 20, and the upper "steady rolls" 19 are directly over the lower "steady rolls" 21. As customary, the upper disks 18 overlap the same sides of the lower disks 20. Thus, at one side A of the machine, the endmost lower disk 20 is at the outer side of the coacting upper disk 18, while at the other side B of the machine, the endmost upper disk 18 is at the outer side of the lower coacting disk 20.

After initial starting of a sheet S (FIGURES 2 and 3) between the upper and lower steady rolls 19 and 21, these rolls feed said sheet on a straight path between the upper and lower slitting disks 18 and 20. Thus, the sheet is progressively slit into strips and its edges are progressively trimmed. The trimmed off edge portions are the scrap strips hereinbefore referred to and these scrap strips are shown at S' in FIGURES 2 and 3 in the initial stage of their formation. As these scrap strips are progressively formed, they are fed, by the forward motion of the sheet S into two scrap strip coiling devices generally denoted at 22. These coiling devices 22 progressively coil each scrap strip S' helically and rather tightly about an axis, and therefore, by the time each scrap strip is completely severed from the sheet, it is in the form of a substantially cylindrical coil C, as illustrated in FIGURE 7.

The two coiling devices 22 are of identical construction, but at the side A of the machine, the coiling device extends over the lower disk 20 and is disposed at the outer side of the coacting upper disk 18, whereas at the side B of the machine, the coiling device extends under the upper disk 18 and is disposed at the outer side of the coacting lower disk 20.

Each coiling device 22 comprises a horizontally elongated straight shank 23 for disposition parallel with the line of feed of the sheet S. This shank has parallel longitudinal edges 24 and 25 and parallel vertical sides 26 and 27. A notch 28 is formed in the front end of the shank 23, said notch having a cylindrically curved wall 29. The axis 30 (FIGURE 6) about which the wall 29 is curved, is at an angle of about 7 degrees to a line 31 perpendicular to the shank side 26, 27, placing said wall 29 oblique to the length of the shank. The front end portion of the shank edge 24 is longitudinally bevelled at 32, and this bevel extends to one end of the notch wall 29, said level and wall being disposed at an extremely acute angle to each other to provide the shank 23 with a sharp lip 33 at said one end of the notch side wall 29. The front end portion of the other shank edge 25 is similarly bevelled at 34, but this bevel extends to the front extremity 35 of the shank in vertically spaced relation with the notch side wall 29. The front end of the shank 23 is thus provided with a thick blunt lip 36 opposite the sharp tapered lip 33. The lip 36 projects somewhat beyond the lip 33, and the notch wall 29 extends almost to the front extremity of said lip 36.

At the side A of the machine, the coiling device 22 is mounted at the outer side of the upper slitting disk 18 with its lip 33 positioned downwardly and substantially in contact with the periphery of the lower slitting disk 20, the end of said lip being somewhat in rear of a vertical line 37 (FIGURE 2) intersecting the axes of the shafts 14 and 15.

At the side B of the machine, the coiling device 22 is mounted at the outer side of the lower slitting disk 20 with its lip 33 disposed upwardly and substantially in contact with the periphery of the upper disk 18, said lip 33 being also somewhat rearward from the line 37, as shown in FIGURE 3.

In each instance, as the scrap strip S' is progressively cut from the sheet S, said scrap strip is guided by the lip 33 into the notch 28. The wall 29 of this notch constitutes a die face which progressively coils the scrap strip helically and rather tightly about an axis, and progressively directs the coil convolutions laterally from said notch 28 as they are being formed. Thus, upon final severance from the sheet, the scrap strip S' will have the form of a tight substantially cylindrical coil, as illustrated in FIGURE 7. An accumulation of these coils may be easily removed from the floor, and it is even feasible to collect them in receptacles as they are formed.

The broken lines 38 in FIGURE 4 merely represent surplus metal which is removed after drilling an opening through the shank 23, this being the most convenient way to form the notch wall 29.

For mounting the coiling device 22, a fixed horizontal bar 39, commonly used for mounting more scrap deflectors, is utilized. Slides 40 are adjustably secured at 41 to the bar 39, and brackets 42 are secured at 43 to said slides 40 for vertical adjustment. The brackets 42 are of L-shape, and their lower portions each have two grooves 44, each groove being of a size to snugly receive the rear portion of the shank 23. At the side A of the machine, the shank 23 is positioned in the bracket groove toward said end, whereas the shank 23 at the side B of the machine is disposed in the other bracket groove. This insures that both brackets 42 shall be clear of the path along which the sheets are fed.

From the foregoing, it will be seen that novel and advantageous provision has been disclosed for attaining the desired ends. However, it is to be understood that variations may well be made within the scope of the invention as defined in the appended claims.

What is claimed as new is as follows:

1. In a method of the class described, the steps of feeding a sheet along a straight path, progressively slitting the sheet near one edge thereof on a line parallel with the line of feed, thereby progressively forming a scrap strip from the portion of the sheet between said edge and the slit, utilizing the advancing movement of the sheet to feed said scrap strip into a fixed strip guiding and coiling device as said scrap strip is being progressively formed, and utilizing said strip coiling device to progressively coil said scrap strip helically about an axis, whereby said scrap strip will have the form of a substantially cylindrical coil upon final severance from the sheet.

2. In the method of trimming metal sheets wherein the sheet is fed in a straight path and is progressively slit near one edge thereof to result in the progressive forming of a plurality of separate longitudinally spaced scrap strips; the method of removing the scrap strips comprising the steps of engaging the leading edge of each scrap strip as the scrap strip is being formed and progressively coiling each scrap strip to define a free helically coiled scrap member which may be readily collected.

3. The method of claim 2, wherein the scrap strips are fed through their attachment to the moving sheet.

References Cited in the file of this patent
UNITED STATES PATENTS

| | | |
|---|---|---|
| 720,092 | Aiken | Feb. 10, 1903 |
| 870,024 | Edison | Nov. 5, 1907 |
| 1,213,480 | Hart | Jan. 23, 1917 |
| 2,006,389 | Fuchs | July 2, 1935 |